United States Patent [19]
Morita

[11] Patent Number: 4,872,123
[45] Date of Patent: Oct. 3, 1989

[54] COMMUTATION COMPENSATION DEVICE FOR A DC MACHINE

[75] Inventor: Noboru Morita, Yokohama, Japan

[73] Assignee: Kabushiki Kaisha Toshiba, Kawasaki, Japan

[21] Appl. No.: 155,960

[22] Filed: Feb. 16, 1988

[30] Foreign Application Priority Data

Feb. 17, 1987 [JP] Japan ................................ 62-33618

[51] Int. Cl.$^4$ ...................... G06F 15/20; H01R 39/46
[52] U.S. Cl. ................................ 364/571.02; 310/186; 318/439; 364/481; 364/571.01
[58] Field of Search ...................... 364/571.01, 571.02, 364/571.04, 571.05, 571.06, 481, 483; 324/129, 158 MG, 545; 310/156, 162, 179, 181, 186, 187, 216; 318/356, 361, 439, 491, 496, 521, 532, 541; 361/30, 33

[56] References Cited

U.S. PATENT DOCUMENTS

| | | | |
|---|---|---|---|
| 4,048,550 | 9/1977 | Harris | 318/521 |
| 4,112,475 | 9/1978 | Stitt et al. | 361/33 |
| 4,217,513 | 8/1980 | Kohzai et al. | 310/186 |
| 4,283,667 | 8/1981 | Dinger | 318/532 |
| 4,435,664 | 3/1984 | Boesel | 310/186 |
| 4,451,752 | 5/1984 | Tahara et al. | 310/186 |
| 4,454,460 | 6/1984 | Tahara et al. | 318/439 |
| 4,577,151 | 3/1986 | Tanisaka et al. | 324/158 MG |
| 4,780,656 | 10/1988 | Mitchell | 361/30 |

FOREIGN PATENT DOCUMENTS 57-129161  8/1982  Japan .
58-116093  7/1983  Japan .

*Primary Examiner*—Parshotam S. Lall
*Assistant Examiner*—Kevin J. Teska
*Attorney, Agent, or Firm*—Foley & Lardner, Schwartz, Jeffery, Schwaab, Mack, Blumenthal & Evans

[57] ABSTRACT

A commutation compensation device for a DC machine of the type in which in addition to an interpole coil for the armature current flow, an interpole is provided with an auxiliary interpole coil and in response to a reference exciting current calculated based on the rate-of-change of the armature current, the exciting current for accomplishing the commutation compensation is caused to flow through a controlled DC power source to the auxiliary interpole coil. In order to further improve a degree of commutation compensation, when the commutation is degraded, the armature current adversely affecting the commutation, the rate-of-change of the armature current and so on are automatically calculated and evaluated by commutation degradation rate calculator, whereby a commutation compensating rate is automatically obtained and in response to the commutation compensating rate the corrected exciting current is delivered to the auxiliary interpole coil.

16 Claims, 2 Drawing Sheets

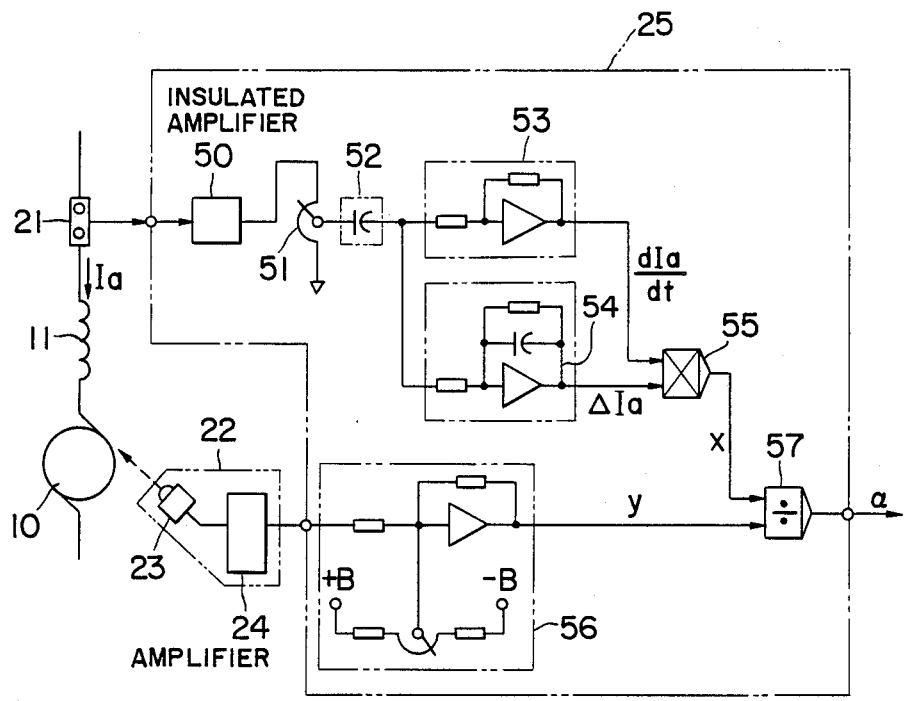
F I G. 3
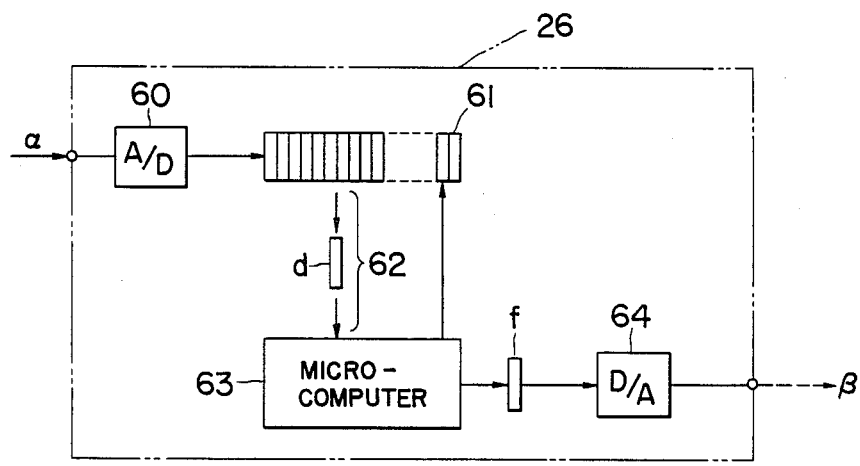
F I G. 4

COMMUTATION COMPENSATION DEVICE FOR A DC MACHINE

BACKGROUND OF THE INVENTION

1. Field of the Art

The present invention relates to a commutation compensation device for a DC machine of the type in which in addition to an interpole coil for armature current flow, an interpole is provided with an auxiliary interpole coil, and in response to a reference exciting current calculated based on a rate-of-change of the armature current the exciting current is caused to flow through a controlled DC power source to the auxiliary interpole coil for compensating commutation.

2. Prior Art

In general, the commutation of a DC machine is satisfactory when there exists a predetermined value of interpole flux in proportion to the armature current, but the commutation is degraded when the auxiliary interpole flux rises above or drops from said predetermined value of interpole flux. When the rise or fall of the value of the interpole flux is compensated by the magnetomotive force, it becomes possible to prevent the degradation of commutation and a device for exciting the auxiliary interpole coil by a special exciting power source so as to prevent the degradation of commutation is a commutation compensation device.

Too high or too low value of interpole flux is caused when the eddy current produced in the magnetic circuit due to rapid change of the armature current causes a time lag in the case of variations of flux. Furthermore, in the case of a DC machine having a great difference between the base speed and the maximum speed, the displacement between a high speed and a low speed of a non-sparking center becomes too long. Therefore, when the value of the auxiliary flux is adjusted for a high speed, the value of interpole flux becomes too low in the case of a low speed and on the other hand when the adjustment is made for a low speed, the value of interpole flux becomes too high in the case of a high speed.

Whether the commutation compensation device can accomplish its function effectively or not is dependent upon a degree of compensation; that is, the determination of a compensation rate. However, there arise various problems as described below in the case of the compensation of the degradation of commutation due to a sudden variation of the armature current. For instance, it is very difficult to estimate the relationship between the delay of flux and the sparking by analysis and also it is difficult to determine the relationship between the delay of the exciting current and the sparking during the tests conducted in a factory. Furthermore, in order to compensate for the displacement due to the speed of the center of the non-sparking band, even when the optimum adjustment has been accomplished in the factory, it varies in response to the variations of the commutation characteristic resulting from the formation of a commutation film after the operation. Thus the determination of the compensation rate is considerably difficult and cumbersome. In the case of the conventional commutation compensation devices, the determination of a compensation rate; that is, the accuracy of the commutation compensation is not satisfactory so that the improvements of the commutation capacity and the overload characteristic of a DC machine are not satisfactory in practice.

SUMMARY OF THE INVENTION

In view of the above, one of the objects of the present invention is to provide a commutation compensation device for a DC machine which not only can improve the commutation capacity but also improve the overload capacity of a DC machine by improving a degree of commutation compensation.

A commutation compensation device in accordance with the present invention is characterized by comprising a commutation degradation detector for detecting the degradation of the commutation in the DC machine; a commutation degradation rate calculator for calculating a degradation rate of commutation in response to the output from the commutation degradation detector and one or more parameters associated with the commutation degradation; a memory or storage device for the commutation degradation rate and the variations of the one or more parameters in the sequence of time; a compensating rate calculator for calculating a compensating rate for the commutation compensation in response to the data stored in the memory or storage device; and a correcting circuit for correcting the reference exciting current in response to the compensating rate obtained from the compensating rate calculator.

In the case of the commutation compensation device in accordance with the present invention, when the commutation is degraded, the degree of influence of the armature current and variations thereof can be automatically calculated and evaluated by the commutation degradation calculator so that in response to the output therefrom the commutation degradation rate can be automatically obtained, whereby the exciting current corrected in response to the commutation degradation rate is supplied to the auxiliary interpole coil. Therefore a degree of commutation compensation can be improved so that the commutation capacity and therefore the overload capacity of the DC machine can be improved.

BRIEF DESCRIPTION OF THE DRAWINGS

In the accompanying drawings,

FIG. 3 is a circuit diagram of a commutation degradation rate circuit shown in FIG. 1; and FIG. 4 is a block diagram illustrating the interior of a compensating rate calculator shown in FIG. 1.

DETAILED DESCRIPTION OF THE PREFERRED EMBODIMENT

Now the commutation compensation to be carried out when the armature current changes suddenly will be described. The commutation degradation resulting from the sudden change of the armature current is caused because the response of the value of the interpole flux in the case of the sudden change of the armature current is delayed with respect to the armature current. In this case, therefore, the auxiliary interpole current is caused to flow so as to compensate a higher or lower value of the interpole flux resulting from the delay in response to the interpole flux. On the other hand, the severance of the sudden change of the armature current is dependent upon an armature current variation rate $dI_a/dt$ obtained by differentiating the armature current in time and the variation $\Delta I_a$ of the armature current. The preferred embodiment to be described hereinafter is based upon such underlying principle.

Figure 1:
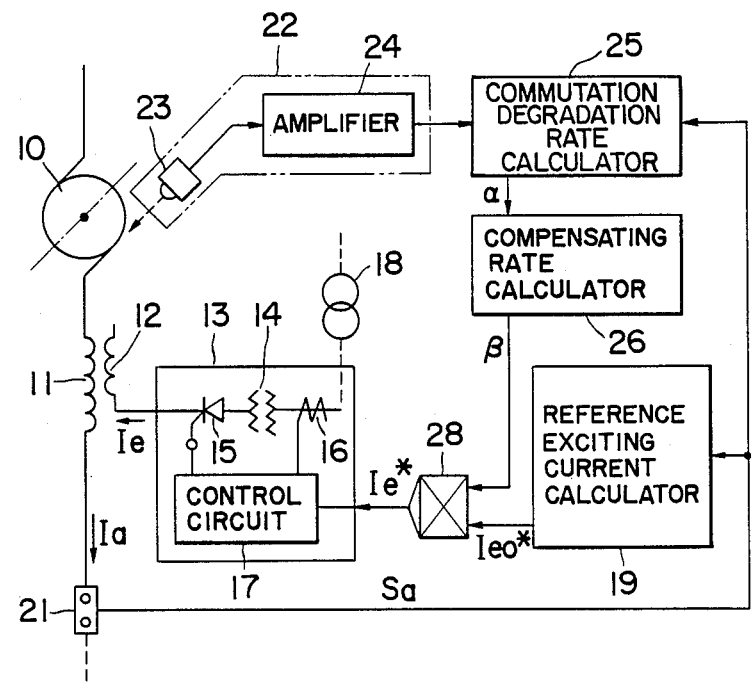
FIG. 1 is a block diagram of a preferred embodiment of the present invention.

In FIG. 1, a DC machine is shown as comprising an armature 10, an i coil 11 and an auxiliary interpole coil 12. Both the interpole coil 11 and the auxiliary interpole coil 12 are mounted as an interpole. As is well known in the art, an armature current $I_a$ is caused to flow through the interpole coil 11 while an exciting current $I_e$ for commutation compensation is caused to flow through the auxiliary interpole coil 12 from a controlled DC power source 13. The controlled DC power source 13 obtains the exciting current $I_e$ by receiving the AC power from a transformer 18 and then rectifying it into a DC power by a converter transformer 14 and a thyristor rectifier 15. The thyristor rectifier 15 is so controlled by a control circuit 17 that the exciting current $I_e$ detected by a current detector 16 on the primary side of the converter transformer 14 is equal to a reference exciting current $I_e^*$ which is obtained in the form of the product $I_e^* = \beta \cdot I_{eo}^*$, where $\beta$ is a compensating rate obtained from a compensating rate calculator 26 and $I_{eo}^*$ is a fundamental reference exciting current obtained from a reference exciting current calculator 19. The multiplication $I_e^* = \beta \cdot I_{eo}^*$ is obtained by a multiplier 28. The reference exciting current calculator 19 delivers the fundamental reference exciting current $I_{eo}^*$ in response to the rate-of-change or differentiated value of an armature current signal $S_a$ representing the armature current $I_a$ detected by a current detector 21.

Figure 2:
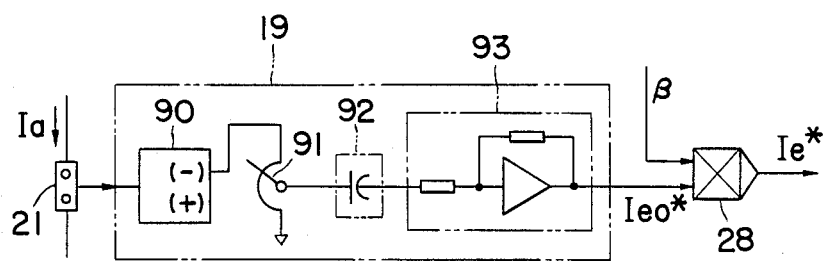
FIG. 2 is a circuit diagram of a reference exciting current calculator shown in FIG. 1.

As best shown in FIG. 2, the reference exciting current calculator 19 comprises an insulated amplifier 90 which isolates the output signal from the current detector 21, a signal level regulator 91 connected to the output of the insulated amplifier 90, a differentiator 92 for differentiating the output from the signal level regulator 91 and a proportional amplifier 93 for amplifying the output from the differentiator 92 so that the reference exciting current calculator 19 is as a whole a circuit which delivers a signal in proportion to the rate-of-change $dI_a/dt$ of the armature current $I_a$. Therefore the fundamental reference exciting current $I_{eo}^*$ for the auxiliary interpole coil 12 which compensates for an insufficient value of transient interpole flux resulting from the time delay of the interpole flux is produced.

In order to detect the commutation degradation of the DC machine, a commutation degradation detector 22 is provided. It comprises a spark sensor 23 for optically detecting the commutation sparks and converting the detection result into an electrical signal and an amplifier 24 for amplifying the output signal from the spark sensor 23, which may be, for instance, a phototransistor or an electric means which utilizes the contact voltage drop between a commutator and brushes.

In response to the output from the commutation degradation detector 22 and the armature current signal $S_a$, a commutation degradation rate calculator 25 delivers a commutation degradation rate $\alpha$.

FIG. 3 shows a detailed circuit diagram of the commutation degradation calculator 25. In this calculator 25, the detection signal of the armature current $I_a$ detected by the current detector 21 is processed by an insulated amplifier 50, a signal level regulator 51 and a differentiator 52 to obtain the armature current variation rate $dI_a/dt$ which in turn is applied to both a proportional amplifier 53 and an incomplete integrator 54.

The incomplete integrator 54 delivers a signal representative of a variation of the armature current $\Delta I_a$. The output signal from the proportional amplifier 53 and the output signal derived from the incomplete integrator 54 are applied to a multiplier 55 which in turn delivers a signal representative of the product x of the multiplication of the current variation rate $dI_a/dt$ and the current variation $\Delta I_a$. The product x is applied as a dividend to a divider 57.

The output signal from the commutation degradation detector 22 is applied to the divisor input of the divider 57. However when the output from the commutation degradation detector 22 is almost zero and when there is substantially no spark, the divider 57 results in overflow. In order to solve this problem, a bias circuit 56 is connected to the divisor input of the divider 57. The divider 57 delivers a commutation degradation rate or a quotient $\alpha = x/y$, where x is the output from the multiplier 55 and y is the output from the bias circuit 56.

In the above-mentioned arrangement, the output x from the multiplier 55 represents a degree of severance of the sudden variation of the armature current and the output $\alpha$ of the divider 57 represents a reciprocal number of a tendency of commutation degradation in response to the same degree of severance of the sudden variation of the armature current or the commutation degradation rate. It follows therefore that the circuit shown in FIG. 3 or the circuit diagram of the commutation degradation rate calculator 25 can be defined as a circuit for rapidly and automatically evaluating the commutation performance or operation all the time in the case of the sudden variation of the armature current.

So far the degree of severance of the sudden variation of the armature current has been represented by the product between the $dI_a/dt$ and $\Delta I_a$, but when a further high degree of accuracy is required, logarithmic amplifiers are connected to the inputs of the divider 55 so that the product between $(di_a/dt)^n$ and $(\Delta I_a)_m$ may be used, where n and m are positive real numbers.

FIG. 4 shows a detailed circuit diagram of the compensating rate calculator 26 which monitors the signal a representative of a reciprocal number of the commutation degradation rate and functions in such a way that the commutation degradation rate becomes a minimum or the reciprocal number of the commutation degradation rate becomes maximum. In this circuit, the analog signal u representative of the reciprocal number of the commutation degradation rate is converted at a predetermined sampling period by an A/D converter 60 into a digital signal which in turn is stored sequentially as the newest data in a memory 61. The data d stored in the memory 61 is applied through a transfer bus 62 to a microcomputer 63 at a predetermined period. The microcomputer 63 calculates a compensating rate $\beta$, which makes the reciprocal number of the commutation degradation rate minimum, based on the maximum data in a series of data derived from the memory 61 or based on the data representative of a minimum reciprocal number of the commutation degradation rate. The compensating rate $\beta$ thus obtained is converted by a D/A converter 64 into an analog signal representative of the compensating rate signal ($\beta$).

In the microcomputer 63 are reset an initial compensating rate and a control width of the compensating rate used for very slightly varying the compensating rate. Furthermore, the microcomputer 63 incorporates therein a compensating rate maintaining means for maintaining the compensating rate from the time point when the control of the compensating rate is interrupted as described above. The above described means determines to increase or decrease the compensating rate in response to the variation of the commutation degradation rate with respect to the very slight control of the compensating rate and the control of the compensating rate is interrupted when the microcomputer 63 detects that the compensating rate has reached a minimum value (that is, the reciprocal number of the compensating degradation rate has reached a maximum value).

In response to the data representative of the commutation degradation rate derived from the commutation degradation rate calculator 25 with the above-described construction, the compensating rate $\beta$ is controlled and furthermore the compensating rate $\beta$ which makes the commutation degradation rate a minimum value is automatically determined and delivered as the analog signal $\beta$. Together with the fundamental reference exciting current $I_{eo}*$ derived from the reference exciting current calculator 19, the signal representative of the compensating rate $\beta$ is applied to the multiplier 28 so that the product between them; that is, the reference exciting current $I_e*$ which is needed in order to accomplish the true commutation compensation is obtained and delivered to the control circuit 17 in the controlled DC power source 13. In response to the corrected reference exciting current $I_e*$, the controlled DC power source 13 feeds the exciting current $I_e$ to the auxiliary interpole coil 12.

When such exciting current $I_e$ is fed to the auxiliary interpole coil 12, a degree of commutation compensation due to the variations of the armature current can be improved, thereby improving the commutation performance of the DC machine and the overload capacity.

In addition, the erroneous operation due to noise or external disturbance can be avoided when, in the case of the commutation compensation when the armature current suddenly varies in order to improve a degree of control of the compensating rate, the data obtained when the sudden variation of the armature current is more severe, that is, only the $\alpha$ signal in excess of a predetermined value is selected and processed; or when only the commutation degradation signal derived when the product between the armature current and the rotational speed is in excess of a predetermined value is selectively utilized. Furthermore only a predetermined number of samples each representing the data of the commutation degradation rate are stored and in response to an average of the samples, the compensating rate is controlled. Moreover, when their variance is in excess of a predetermined value, it is determined that the stability of the mechanical contacts of brushes due to poor maintenance is insufficient, and then the control is interrupted.

When the variance of the data which represents the commutation degradation rate and is stored in the microcomputer 63 becomes in excess of a predetermined value, an alarm lamp can be turned on or an alarm message can be generated.

The microcomputer 63 has a memory or storage device for storing therein the control processes which have been already accomplished by the microcomputer 63 and the variations of the commutation degradation rate in the sequence of time, so that in response to the demand from an operator, such stored data can be delivered.

Furthermore, the commutation degradation detector may consist of a plurality of detectors whose detection principles are different from each other so that only when their outputs show the same tendency in the case of the commutation degradation, the arithmetic operation of the commutation degradation rate may be carried out.

Moreover the commutation degradation detector may comprise an odd number (more than three) of detectors which operate based upon the same detection principle and in accordance with the principle of majority logic when the data having the same value are greater in number than the data having the different values, the commutation degradation rate may be calculated in response to the majority data.

In addition, so far the analog arithmetic circuit has been described as a discrete component part, but it is to be understood that a common computer or microcomputer may be used so that the arithmetic operations may be carried out in response to software.

What is claimed is:

1. In a commutation compensation device for a DC machine of a type having an auxiliary interpole coil mounted on an interpole provided with an interpole coil independently thereof so that, in response to a reference exciting current based on the rate-of-change of an armature current, an exciting current is caused to flow through a controlled DC power source to said auxiliary interpole coil so as to compensate commutation, the improvement comprising:

commutation degradation detector means for detecting the degradation of commutation of said DC machine;

commutation degradation rate calculator means for calculating a commutation degradation rate in response to the output from said commutation degradation detector means and at least one parameter associated with the commutation degradation, said parameter being different from said output;

memory means for storing therein said commutation degradation rate and said parameter sequentially as the newest data;

compensating rate calculator means for calculating a compensating rate to accomplish the commutation compensation in response to the data stored in said memory means; and means for correcting said reference exciting current in response to the compensating rate obtained from said compensating rate calculating means.

2. A commutation compensation device as set forth in claim 1, wherein an armature current variation rate and the variation of an armature current are used as parameters associated with said commutation degradation.

3. A commutation compensation device as set forth in claim 1, wherein said commutation degradation detector means comprises a sensor for detecting commutation sparks and signal processing means for processing the output from said sensor as a signal.

4. A commutation compensation device as set forth in claim 1, wherein said memory means consists of a digital memory.

5. A commutation compensation device as set forth in claim 1, wherein said memory means is provided with means for storing the data of the commutation degradation rate into said memory means only when the armature current is in excess of a predetermined level.

6. A commutation compensation device as set forth in claim 1, wherein said memory means is provided with means for storing the data of the commutation degradation only when the product between the armature current and the rotational speed is in excess of a predetermined value.

7. A commutation compensation device as set forth in claim 1, wherein said commutation degradation detector means has a plurality of detection means which operate on different detection principles, respectively, and the calculation operation of said commutation degradation rate calculator means is activated only when said detection means exhibit the same tendency as to the commutation degradation in the detection results from said plurality of detection means.

8. A commutation compensation device as set forth in claim 1, wherein said commutation degradation detector means includes an odd number higher than three of detection means which operate based on a same detection principle and the detection results from said odd number of detection means are selected or rejected in accordance with a majority logic principle.

9. A commutation compensation device as set forth in claim 1, wherein said commutation degradation rate calculator means calculates a commutation degradation rate as an average in commutation degradation rate of a number of samples in excess of a predetermined number.

10. A commutation compensation device as set forth in claim 9, wherein said commutation degradation rate calculator means calculates a variance of each commutation degradation rate at a predetermined time interval and delivers as the commutation degradation rate an average of the commutation degradation rates whose variance calculated in the manner described above is within a predetermined range.

11. A commutation compensation device as set forth in claim 1, wherein said commutation degradation rate calculator means includes multiplier means or obtaining the product of the armature current multiplied by the armature current variation rate as a physical value representative of a degree of sudden variation of the armature current.

12. A commutation compensation device as set forth in claim 11, wherein said commutation degradation rate calculator means includes divider means for obtaining a quotient of said physical value representative of a degree of sudden variation of the armature current and the output from said commutation degradation detector means, and means for preventing the overflow of said divider means.

13. A commutation compensation device as set forth in claim 11, wherein said memory means is provided with means for storing the data of the commutation degradation rate into said memory means only when a physical value representative of a degree of sudden variation of the armature current is in excess of a predetermined value.

14. A commutation compensation device as set forth in claim 1, wherein said commutation degradation calculator means includes first means for raising the armature current to m-th power, second means for raising the armature current variation rate to n-th power and multiplier means for obtaining the product of the multiplication of the output from said first means by the output from said second means.

15. A commutation compensation device as set forth in claim 14, wherein said commutation degradation rate calculator means includes divider means for obtaining a quotient of said physical value representative of a degree of sudden variation of the armature current and the output from said commutation degradation detector means, and means for preventing the over flow of said divider means.

16. A commutation compensation device as set forth in claim 14, wherein said memory means is provided with means for storing the data of the commutation degradation rate into said memory means only when a physical value representative of a degree of sudden variation of the armature current is in excess of a predetermined value.

* * * * *